United States Patent
Matsuda

(10) Patent No.: US 10,351,121 B2
(45) Date of Patent: Jul. 16, 2019

(54) ELECTRIC MOTORCYCLE, VEHICLE CONTROLLER AND VEHICLE CONTROL METHOD

(71) Applicant: Kawasaki Jukogyo Kabushiki Kaisha, Kobe-shi, Hyogo (JP)

(72) Inventor: Yoshimoto Matsuda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 243 days.

(21) Appl. No.: 15/642,213

(22) Filed: Jul. 5, 2017

(65) Prior Publication Data

US 2017/0297552 A1    Oct. 19, 2017

Related U.S. Application Data

(62) Division of application No. 14/117,364, filed as application No. PCT/JP2011/002666 on May 13, 2011, now abandoned.

(51) Int. Cl.
*B60W 10/08* (2006.01)
*B60L 50/60* (2019.01)
(Continued)

(52) U.S. Cl.
CPC ............ *B60W 10/08* (2013.01); *B60L 3/003* (2013.01); *B60L 3/0038* (2013.01);
(Continued)

(58) Field of Classification Search
CPC ....... B60W 10/08; B60W 10/10; B60L 50/66; B60L 50/51; B60L 58/12; B60L 3/003;
(Continued)

(56) References Cited

U.S. PATENT DOCUMENTS

| 5,453,930 A | 9/1995 | Imaseki et al. |
| 6,104,154 A * | 8/2000 | Harada ................. B62K 5/027 280/255 |

(Continued)

FOREIGN PATENT DOCUMENTS

| JP | H06038305 A | 2/1994 |
| JP | H09191582 A | 7/1997 |

(Continued)

OTHER PUBLICATIONS

ISA Japanese Patent Office, International Search Report Issued in PCT Application No. PCT/JP2011/002666, dated Aug. 9, 2011, WIPO, 4 pages. (Submitted with English Translation of Search Report).

(Continued)

*Primary Examiner* — John Olszewski
*Assistant Examiner* — Thomas E Worden
(74) *Attorney, Agent, or Firm* — Alleman Hall Creasman & Tuttle LLP

(57) ABSTRACT

An electric motorcycle includes a driving command detecting device, a state value detecting device, an electric motor driving a drive wheel, a control unit for executing a non-normal mode causing output of the electric motor in a non-normal mode to differ from the output of the electric motor in a normal mode, the control unit configured to shift the electric motorcycle from one of the normal or non-normal modes to the other normal or non-normal mode, when the state value satisfies a predetermined shift condition, in one of the normal and non-normal modes, and a cornering determiner unit for determining cornering status, wherein the control unit causes a change in the output of the electric motor to be less, when the electric motorcycle is cornering and the shift condition is satisfied than when the (Continued)

cornering determiner unit determines the electric motorcycle is not cornering and the shift condition is satisfied.

10 Claims, 13 Drawing Sheets

(51) Int. Cl.
| | |
|---|---|
| *B60L 58/12* | (2019.01) |
| *B60L 50/51* | (2019.01) |
| *B60L 3/00* | (2019.01) |
| *B60L 3/04* | (2006.01) |
| *B60L 7/14* | (2006.01) |
| *B60L 15/20* | (2006.01) |
| *B60W 10/10* | (2012.01) |
| *B62J 99/00* | (2009.01) |
| *B62K 11/06* | (2006.01) |
| *B62K 25/28* | (2006.01) |

(52) U.S. Cl.
CPC ............... *B60L 3/0061* (2013.01); *B60L 3/04* (2013.01); *B60L 7/14* (2013.01); *B60L 15/2009* (2013.01); *B60L 15/2054* (2013.01); *B60L 50/51* (2019.02); *B60L 50/66* (2019.02); *B60L 58/12* (2019.02); *B60W 10/10* (2013.01); *B62J 99/00* (2013.01); *B62K 11/06* (2013.01); *B62K 25/283* (2013.01); *B60L 2200/12* (2013.01); *B60L 2200/32* (2013.01); *B60L 2240/12* (2013.01); *B60L 2240/24* (2013.01); *B60L 2240/421* (2013.01); *B60L 2240/423* (2013.01); *B60L 2240/425* (2013.01); *B60L 2240/486* (2013.01); *B60L 2240/507* (2013.01); *B60L 2240/525* (2013.01); *B60L 2240/545* (2013.01); *B60L 2240/547* (2013.01); *B60L 2240/549* (2013.01); *B60L 2250/24* (2013.01); *B60L 2260/28* (2013.01); *B62J 2099/0013* (2013.01); *B62K 2204/00* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01)

(58) Field of Classification Search
CPC ........ B60L 3/0038; B60L 3/0061; B60L 3/04; B60L 7/14; B60L 15/2009; B60L 15/2054; B60L 2200/12; B60L 2200/32; B60L 2240/12; B60L 2240/24; B60L 2240/421; B60L 2240/423; B60L 2240/425; B60L 2240/486; B60L 2240/507; B60L 2240/525; B60L 2240/545; B60L 2240/547; B60L 2240/549; B60L 2250/24; B60L 2260/28; B62J 99/00; B62J 2099/0013; B62K 11/06; B62K 25/283; B62K 2204/00; Y02T 10/645; Y02T 10/7005; Y02T 10/7044; Y02T 10/705; Y02T 10/72; Y02T 10/7275

See application file for complete search history.

(56) References Cited

U.S. PATENT DOCUMENTS

| | | |
|---|---|---|
| 6,268,794 B1 | 7/2001 | Tzanev |
| 6,334,502 B1 | 1/2002 | Tsujimoto |
| 2008/0221760 A1* | 9/2008 | Wakamatsu ........ F16H 61/0213 701/52 |
| 2010/0065361 A1 | 3/2010 | Nam et al. |
| 2011/0079453 A1 | 4/2011 | Wanger et al. |
| 2011/0160976 A1* | 6/2011 | Matsuda ............... B60T 8/1706 701/70 |
| 2012/0049797 A1 | 3/2012 | Tamaki et al. |
| 2013/0041522 A1 | 2/2013 | Mori et al. |
| 2013/0151057 A1 | 6/2013 | Matsubara et al. |
| 2014/0058609 A1 | 2/2014 | Matsuda |
| 2014/0062228 A1 | 3/2014 | Carpenter et al. |
| 2014/0096550 A1 | 4/2014 | Gao et al. |
| 2016/0214611 A1 | 7/2016 | Neaves |

FOREIGN PATENT DOCUMENTS

| | | |
|---|---|---|
| JP | 2006256423 A | 9/2006 |
| JP | 2007131179 A | 5/2007 |
| WO | 2011072942 A1 | 6/2011 |

OTHER PUBLICATIONS

European Patent Office, Extended European Search Report Issued in European Application No. 11865937.4, dated Mar. 27, 2015, Germany, 6 pages.

* cited by examiner

ELECTRIC MOTORCYCLE, VEHICLE CONTROLLER AND VEHICLE CONTROL METHOD

CROSS REFERENCE TO RELATED APPLICATIONS

The present application is a divisional of U.S. patent application Ser. No. 14/117,364, filed Nov. 12, 2013, and entitled ELECTRIC MOTORCYCLE, VEHICLE CONTROLLER AND VEHICLE CONTROL METHOD, which is a U.S. National Stage of International Application No. PCT/JP2011/002666 filed May 13, 2011, the entire disclosure of each of which is hereby incorporated herein by reference for all purposes.

TECHNICAL FIELD

The present invention relates to an electric motorcycle, a vehicle controller and a vehicle control method, in which a driving mode shifts based on a state value of the electric motorcycle or a vehicle.

BACKGROUND ART

In an electric vehicle which generates driving power by actuating a motor using electric power supplied from a battery, a motor output is changed based on information different from a driving command, in some cases. For example, there is a technique which shifts the electric vehicle to an output limiting mode for limiting a motor output for a specified time to prevent a temperature of a motor and a temperature of an inverter from rising to excess, when these temperatures exceed their allowable ranges, a technique which shifts the electric vehicle to an output limiting mode for limiting a motor output by limiting a battery output for a specified time to protect the battery, when a temperature of the battery exceeds an allowable range or when a voltage or the like of the battery falls below an allowable range, or the like (e.g., see Patent Literature 1). After the electric vehicle shifts to the output limiting mode, it is controlled so as to return from the output limiting mode to a normal mode, when a state value such as the motor temperature, the inverter temperature, the battery temperature, or the battery voltage is restored to fall within its allowable range.

CITATION LIST

Patent Literature

Patent Literature 1: Japanese-Laid Open Patent Application Publication No. Hei 9-191582

SUMMARY OF INVENTION

Technical Problem

However, when the state value falls outside of a predetermined range in the middle of cornering, and as a result, the electric vehicle automatically shifts from the normal mode to another output mode, driving power changes in the middle of the cornering, during which the driver is more likely to feel nervous, which may make the driver's driving feeling worse. Especially in the case of a motorcycle, its vehicle body is banked during the cornering, and therefore the change in the driving power significantly affects the driving feeling.

Accordingly, an object of the present invention is to improve driving feeling during cornering in a vehicle in which a driving mode shifts based on a state value different from a driving command.

Solution To Problem

The present invention has been made in view of the above mentioned circumstances, and an electric motorcycle of the present invention comprises: a driving command detecting device for detecting a driving command input by a driver; a state value detecting device for detecting a state value different from the driving command; an electric motor for generating driving power transmitted to a drive wheel; a control unit capable of executing a normal mode for controlling an output of the electric motor in response to the driving command detected by the driving command detecting device and a non-normal mode for causing the output of the electric motor in the non-normal mode to be different from the output of the electric motor in the normal mode, the control unit being configured to shift the electric motorcycle from one of the normal mode and the non-normal mode to the other of the normal mode and the non-normal mode, when the state value detected by the state value detecting device satisfies a predetermined shift condition, in the one of the normal mode and the non-normal mode; and a cornering determiner unit for determining whether or not the electric motorcycle is cornering; wherein the control unit causes a change in the output of the electric motor to be less, when the cornering determiner unit determines that the electric motorcycle is cornering and the shift condition is satisfied than when the cornering determiner unit determines that the electric motorcycle is not cornering and the shift condition is satisfied.

In accordance with this configuration, when it is determined that the electric motorcycle is cornering and the shift condition is satisfied, the electric motor is controlled such that a change in the output is suppressed. This makes it possible to suppress a great change in driving power during the cornering. Therefore, in the electric motorcycle which shifts the driving mode based on the state value different from the driving command, driving feeling during the cornering can be improved. The phrase "a change in the motor output is caused to be less (suppressed)" means that a change in the motor output due to the mode shift is prevented by inhibiting the mode shift, and the mode shift is performed while keeping a state in which a change in the motor output due to the mode shift is lessened, than when the electric motorcycle is not cornering.

The control unit may inhibit the electric motorcycle from shifting from the one of the normal mode and the non-normal mode to the other of the normal mode and the non-normal mode, when the cornering determiner unit determines that the electric motorcycle is cornering and the shift condition is satisfied.

In accordance with this configuration, when it is determined that the electric motorcycle is cornering and the shift condition is satisfied, the mode shift is inhibited. This makes it possible to prevent a change in the output of the electric motor due to the mode shift. Therefore, driving feeling during the cornering can be improved easily and surely.

The control unit may control the output of the electric motor such that at least one of a change amount of the output of the electric motor and a change rate of the output of the electric motor which occurs with time in a case where the electric motorcycle shifts from the one of the normal mode and the non-normal mode to the other of the normal mode and the non-normal mode, is made less, when the cornering determiner unit determines that the electric motorcycle is cornering and the shift condition is satisfied than when the cornering determiner unit determines that the electric motorcycle is not cornering and the shift condition is satisfied.

In accordance with this configuration, when it is determined that the electric motorcycle is cornering and the shift condition is satisfied, at least one of the change amount and the change rate of the output of the electric motor, which occur at the time of the mode shift, is reduced. This makes it possible to suppress a change in the output of the electric motor due to the mode shift, during execution of the mode shift. As a result, it becomes possible to achieve advantages provided by the control for the mode shift and improve driving feeling during the cornering.

The electric motorcycle may further comprise a battery for supplying electric power to the electric motor; and an inverter interposed between the electric motor and the battery; wherein the state value detecting device may detect as the state value a state of at least one of driving system electric devices including the electric motor, the battery and the inverter; wherein the shift condition may include a non-normal mode shift condition for shifting the electric motorcycle from the normal mode to the non-normal mode, in which the state value is a predetermined non-normal value, and a normal mode shift condition for shifting the electric motorcycle from the non-normal mode to the normal mode, in which the state value is a predetermined normal value; and wherein the control unit may cause the output of the electric motorcycle in the non-normal mode to be less than the output of the electric motorcycle in the normal mode.

In accordance with this configuration, when the driving system electric device is placed in a non-normal state, in the normal mode, the electric motorcycle shifts to the non-normal mode for reducing the output of the electric motor. Thus, the driving system electric device can be protected.

The electric motorcycle may further comprise a battery for supplying electric power to the electric motor; and an inverter interposed between the electric motor and the battery; wherein the state value detecting device may include at least one of a temperature sensor for detecting as the state value a temperature of at least one of the battery, the inverter and the electric motor, a battery sensor for detecting a discharge ability of the battery as the state value, a rotational speed sensor for detecting a rotational speed of the electric motor as the state value, a vehicle speed sensor for detecting a vehicle speed as the state value, and an abnormality detecting device for detecting as the state value an abnormality of a sensor for detecting input information used to control the electric motor; wherein the shift condition may include an output limiting mode shift condition which is at least one of a condition in which the temperature detected by the temperature sensor exceeds a predetermined allowable value, a condition in which the discharge ability detected by the battery sensor is less than a predetermined allowable value, a condition in which the rotational speed detected by the rotational speed sensor is equal to or greater than a predetermined upper limit rotational speed, a condition in which the vehicle speed detected by the vehicle speed sensor is equal to or greater than a predetermined upper limit speed, and a condition in which the abnormality is detected by the abnormality detecting device; wherein the non-normal mode may include an output limiting mode for causing the output of the electric motor in the output limiting mode to be less than the output of the electric motor in the normal mode; and wherein the control unit may shift the electric motorcycle to the output limiting mode when the output limiting mode shift condition is satisfied, in the normal mode.

In accordance with this configuration, since the output of the electric motor is decreased in the output limiting mode, for example, the electric motor, the battery and/or the inverter are protected, or a driving speed is decreased or the rotational speed or the vehicle speed is limited, when the discharge ability of the battery is lowered, or the abnormality has occurred in the sensor.

The control unit may control the output of the electric motor such that a target value of the output of the electric motor gets gradually closer to a target value after the mode shift, when the cornering determiner unit determines that cornering has finished with the shift condition satisfied, from a state in which a change in the output of the electric motor is suppressed since the cornering determiner unit determines that the electric motorcycle is cornering and the shift condition is satisfied.

In accordance with this configuration, when the cornering finishes in a state in which a change in the motor output is suppressed during the cornering, a target value of the motor output is made to get gradually closer to a target value after the mode shift. Therefore, the mode shift can be completed while keeping a good driving feeling.

The shift condition may include a predetermined output rapid-increase mode shift condition; wherein the non-normal mode may include an output rapid-increase mode for causing the output of the electric motor in the output rapid-increase mode to be greater than the output of the electric motor in the normal mode for a specified time, when an increase rate of an accelerator displacement amount detected by the driving command detecting device is equal to or greater than a predetermined threshold; and wherein the control unit may shift the electric motorcycle to the output rapid-increase mode, when the output rapid-increase mode shift condition is satisfied in the normal mode.

In accordance with this configuration, the motor output is made greater for a specified time, when the accelerator displacement amount is rapidly increased in the output rapid-increase mode, than when the accelerator displacement amount is rapidly increased in the normal mode. This causes a greater acceleration than that in the normal mode for a moment. In this way, an acceleration response felt by the driver is improved.

The electric motorcycle may further comprise a cornering state determiner unit for determining whether or not a driving state is a final phase of cornering; wherein when the cornering state determiner unit determines that the driving state is the final phase of the cornering, in a state in which the cornering determiner unit determines that the electric motorcycle is cornering and the output rapid-increase mode shift condition is satisfied, the control unit does not suppress a change in the output of the electric motor.

In accordance with this configuration, when the electric motorcycle has reached the final phase of the cornering, an increase in the output of the electric motor is not suppressed, and a great acceleration is allowed. Therefore, accelerated driving is enabled to smoothly occur at the end of the cornering.

The electric motorcycle may further comprise a notification device for performing notification to the driver; wherein the control unit may cause the notification device to notify the driver that a change in the output of the electric motor is suppressed, when the cornering determiner unit determines that the electric motorcycle is cornering and the shift condition is satisfied.

In accordance with this configuration, the driver is notified that a change in the output of the electric motor is suppressed. In this way, the driver can know a controlled state of the electric motorcycle.

The control unit may vary a degree to which the change in the output of the electric motor is suppressed, according to a driving state during the cornering.

In accordance with this configuration, since the degree to which the change in the output of the electric motor is suppressed is varied according to a driving state during the cornering, it becomes possible to achieve advantages provided by the control for the mode shift and improve driving feeling during the cornering.

A vehicle controller of the present invention comprises a driving command reception section for receiving a driving command input by a driver; a state value reception section for receiving a state value different from the driving command; a normal mode executing section for controlling an output of a driving source in response to the driving command; a non-normal mode executing section for causing the output of the driving source in a non-normal mode to be different from the output of the driving source in a normal mode; a mode shift control section for shifting a vehicle from one of the normal mode and the non-normal mode to the other of the normal mode and the non-normal mode, when the state value received by the state value reception section satisfies a predetermined shift condition, in the one of the normal mode and the non-normal mode; and a cornering determiner section for determining whether or not the vehicle is cornering; wherein the mode shift control section causes a change in the output of the driving source to be less, when the cornering determiner section determines that the vehicle is cornering and the shift condition is satisfied than when the cornering determiner section determines that the vehicle is not cornering and the shift condition is satisfied.

A vehicle control method of the present invention comprises the steps of: receiving a driving command input by a driver; receiving a state value different from the driving command; controlling an output of a driving source in response to the driving command in a normal mode; causing the output of the driving source in a non-normal mode to be different from the output of the driving source in the normal mode; shifting a vehicle from one of the normal mode and the non-normal mode to the other of the normal mode and the non-normal mode, when the state value satisfies a predetermined shift condition, in the one of the normal mode and the non-normal mode; and determining whether or not the vehicle is cornering; wherein in the step of shifting the vehicle from one of the normal mode and the non-normal mode to the other of the normal mode and the non-normal mode, a change in the output of the driving source is caused to be less, when it is determined that the vehicle is cornering and the shift condition is satisfied than when it is determined that the vehicle is not cornering and the shift condition is satisfied.

Advantageous Effects of Invention

As should be appreciated from the above, in accordance with the present invention, driving feeling during cornering can be improved in a vehicle in which a driving mode shifts based on a state value different from a driving command.

DESCRIPTION OF EMBODIMENTS

Hereinafter, an embodiment of the present invention will be described with reference to the drawings.

Figure 1:
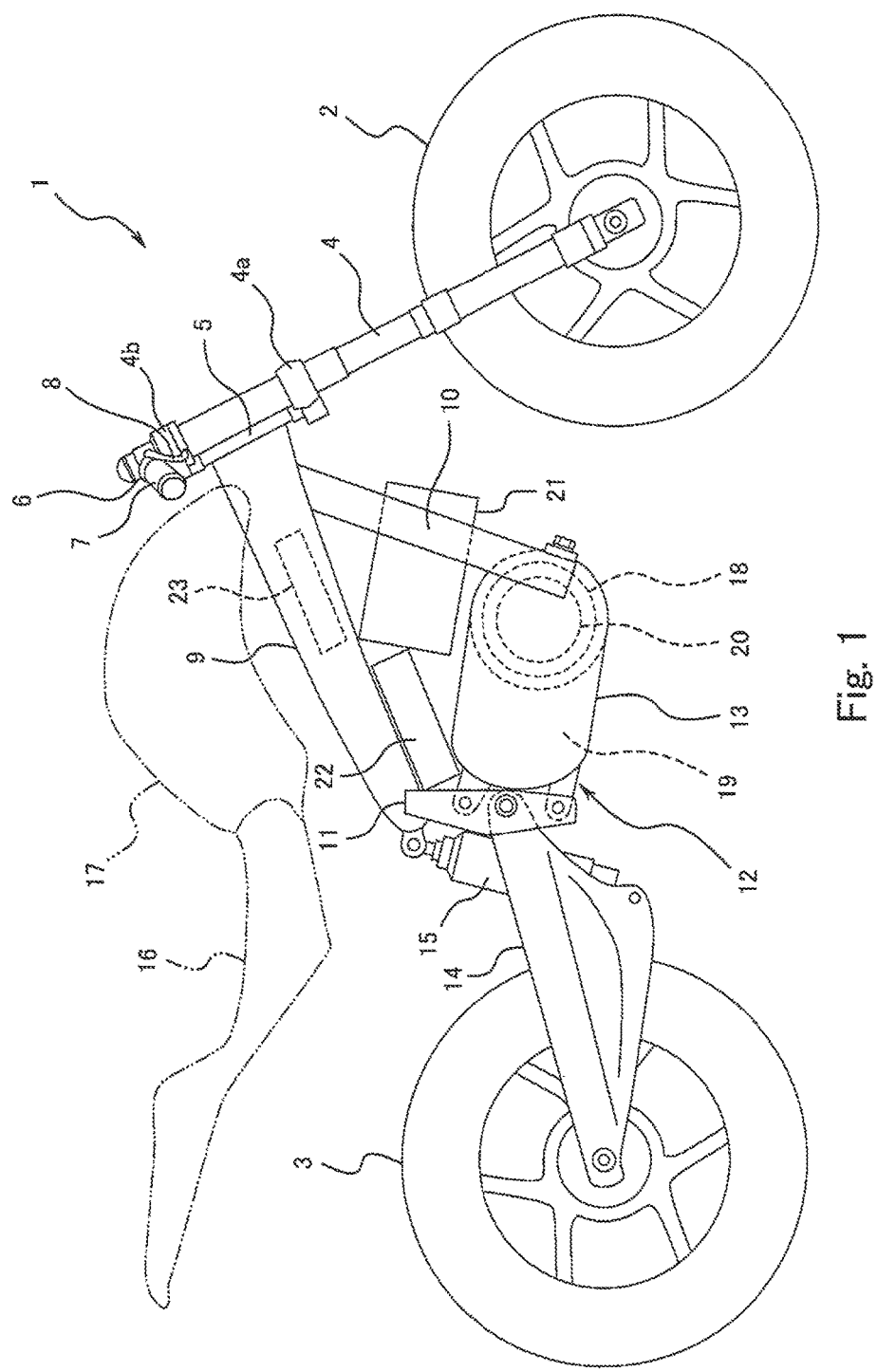
FIG. 1 is a right side view of an electric motorcycle according to an embodiment of the present invention.

FIG. 1 is a right side view of an electric motorcycle 1 (vehicle) according to an embodiment of the present invention. As shown in FIG. 1, the electric motorcycle 1 includes a front wheel 2 which is a driven wheel and a rear wheel 3 which is a drive wheel. The front wheel 2 is rotatably mounted to lower end portions of a pair of right and left front forks 4 extending substantially vertically. Upper portions of the front forks 4 are mounted to a steering shaft (not shown) via a pair of upper and lower brackets 4a, 4b. The steering shaft is rotatably supported in a state in which it is inserted into a head pipe 5 of a vehicle body. A bar-type handle 6 extending rightward and leftward is attached to the upper bracket 4b. A driver rotates the handle 6 rightward or leftward to steer the front wheel 2. An accelerator grip 7 is provided at a right side of the handle 6. The accelerator grip 7 is gripped by the driver's right hand and rotated by twisting a wrist. A brake lever 8 is provided in front of the accelerator grip 7. A fixed grip (not shown) gripped by the driver's left hand is provided at a left side of the handle 6. A clutch lever (not shown) is provided in front of the fixed grip.

A vehicle body frame of the electric motorcycle 1 includes a pair of main frames 9 extending in a substantially linear shape in a side view such that they extend rightward and leftward from the head pipe 5 in a rearward direction and are inclined in a slightly downward direction. A pair of right and left down frames 10 are coupled to front end portions of the main frames 9 such that the down frames 10 extend downward from the front end portions, respectively.

Upper portions of a pivot frame 11 of a frame shape are provided at rear end portions of the main frames 9, respectively. A rear portion of a case 13 of a power plant 12 is fastened to the pivot frame 11. A front portion of the case 13 is fastened to lower end portions of the down frames 10. A front end portion of a swing arm 14 supporting the rear wheel 3 is mounted to the pivot frame 11 such that the swing arm 14 is vertically pivotable around the front end portion. A rear suspension 15 is interposed between an intermediate portion of the swing arm 14 and a rear end portion of the main frame 9. As indicated by a virtual line of FIG. 1, a straddle seat 16 is disposed above the swing arm 14. The seat 16 is supported on a rear frame (not shown) connected to the main frames 9. A dummy tank 17 is disposed in front of the seat 16 such that the driver can sandwich the dummy tank 17 with the driver's right and left legs.

The case 13 of the power plant 12 accommodates an electric motor 18 for generating driving power, a transmission 19 for changing a speed of rotational power from the electric motor 18 and transmitting the resulting rotational power to the rear wheel 3, and a clutch 20 for permitting or inhibiting transmission of the driving power between the electric motor 18 and the transmission 19. A battery 21 is disposed above a front side of the case 13 of the power plant 12 to supply electric power to the electric motor 18. An inverter 22 is disposed above a rear side of the case 13 of the power plant 12 to convert DC power of the battery 21 into AC power and supply the AC power to the electric motor 18, or convert the AC power (regenerative electric power) generated by the electric motor 18 operative as a generator into the DC power to charge the battery 21 with the DC power. An ECU 23 (vehicle controller) as will be described in detail later is disposed between the pair of right and left main frames 9. In the present embodiment, the electric motor 18, the battery 21 and the inverter 22 will be referred to as driving system electric devices.

Figure 2:
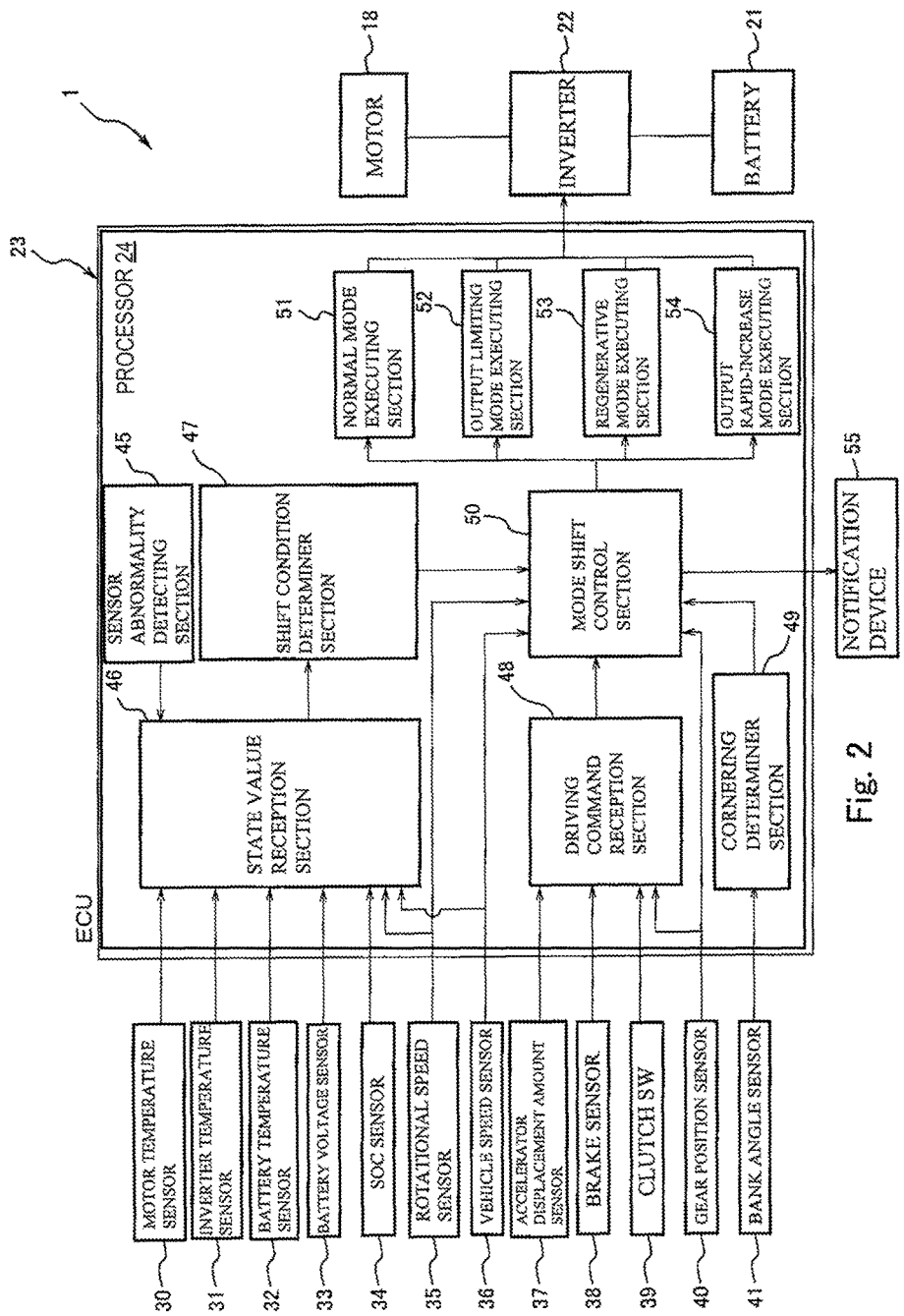
FIG. 2 is a block diagram showing a control system in the electric motorcycle of FIG. 1.

FIG. 2 is a block diagram showing a control system in the electric motorcycle 1 of FIG. 1. ECU 23 includes a processor 24 and associated electronic memory. As shown in FIG. 2, sensors 30 to 41 are connected as inputs to the ECU 23. A motor temperature sensor 30 detects a temperature of the electric motor 18. An inverter temperature sensor 31 detects a temperature of the inverter 22. A battery temperature sensor 32 detects a temperature of the battery 21. A battery voltage sensor 33 detects a voltage output from the battery 21. An SOC sensor 34 detects SOC (state of charge) of the battery 21. That is, the battery voltage sensor 33 and the SOC sensor 34 detect a discharge ability of the battery 21. A rotational speed sensor 35 detects a rotational speed of the electric motor 18. A vehicle speed sensor 36 detects a driving speed of the electric motorcycle 1. As the vehicle speed sensor 36, for example, a front wheel speed sensor for detecting a rotational speed of the front wheel 2 which is the driven wheel, is used. An accelerator displacement amount sensor 37 detects a displacement amount (opening degree) of the accelerator grip 7. A brake sensor 38 detects a displacement amount (braking amount) of the brake lever 8. A clutch switch 39 detects whether a clutch 20 is engaged or disengaged. A gear position sensor 40 detects a transmission gear position (reduction gear ratio) of the transmission 19. A bank angle sensor 41 detects a vehicle body bank angle formed when a vehicle body of the electric motorcycle 1 is banked laterally from its upright state.

The ECU 23 includes a sensor abnormality detecting section 45, a state value reception section 46, a shift condition determiner section 47, a driving command reception section 48, a cornering determiner section 49, a mode shift control section 50, a normal mode executing section 51, an output limiting mode executing section 52, a regenerative mode executing section 53, and an output rapid-increase mode executing section 54. The sensor abnormality detecting section 45 detects an abnormality in any of the sensors 30 to 41 for detecting input information used to control the electric motor 18. For example, the sensors 30 to 41 are provided in pairs. If values detected by each pair of sensors, among the sensors 30 to 41, are equal, the sensor abnormality detecting section 45 detects that these sensors are working normally, whereas if the detected values are different from each other, the sensor abnormality detecting section 45 detects that an abnormality has occurred in the sensor(s).

The state value reception section 46 receives a signal from the motor temperature sensor 30, the inverter temperature sensor 31, the battery temperature sensor 32, the battery voltage sensor 33, the SOC sensor 34, the rotational speed sensor 35, the vehicle speed sensor 36, the sensor abnormality detecting section 45, and other sensors, i.e., state value different from the driving command. That is, in the present embodiment, the motor temperature sensor 30, the inverter temperature sensor 31, the battery temperature sensor 32, the battery voltage sensor 33, the SOC sensor 34, the rotational speed sensor 35, the vehicle speed sensor 36, and the sensor abnormality detecting section 45, constitute a state value detecting device. The state value refers to a value relating to a state of a device built into the electric motorcycle 1, which is variable irrespective of the driving command input by the driver. The driving command refers to a command input by the driver to change the driving state of the electric motorcycle 1, such as a command of the accelerator displacement amount, a command of the brake displacement amount, a command for engaging/disengaging the clutch, a command of a transmission gear position, etc.

As will be described later, the shift condition determiner section 47 determines whether or not the state value received by the state value reception section 46 satisfies a predetermined shift condition used to execute a mode shift between a normal mode and a non-normal mode (output limiting mode, regenerative mode, output rapid-increase mode) different from the normal mode. The driving command reception section 48 receives the signal from the accelerator displacement amount sensor 37, the brake sensor 38, the clutch switch 39, the gear position sensor 40, and other sensors, i.e., the driving command input by the driver. That is, in the present embodiment, at least one of the accelerator displacement amount sensor 37, the brake sensor 38, the clutch switch 39, and the gear position sensor 40 constitutes a driving command detecting device. The cornering determiner section 49 determines whether or not the electric motorcycle 1 is cornering (in the middle of cornering). For example, when the bank angle of the vehicle body, from the upright state, which is detected by the bank angle sensor 41, is equal to or greater than a predetermined angle, the cornering determiner section 49 determines that the electric motorcycle 1 is cornering.

The mode shift control section 50 controls the mode shift among the driving modes (normal mode, output limiting mode, regenerative mode, output rapid-increase mode) based on a result of a determination performed by the shift condition determiner section 47 and a result of a determination performed by the cornering determiner section 49. The electric motorcycle 1 includes a notification device 55 for notifying the driver of information by the blinking of a lamp or the like, by emitting a sound using a speaker, etc. If the mode shift is inhibited even in a state in which the shift condition is satisfied as will be described later, the mode shift control section 50 causes the notification device 55 to notify the driver that the mode shift is inhibited. Or, the mode shift control section 50 is able to change control of the motor output in the middle of the mode shift, based on the signal from any of the rotational speed sensor 35, the vehicle speed sensor 36, and the gear position sensor 40.

The normal mode executing section 51 executes the normal mode for controlling the output (to be precise, torque) of the electric motor 18 in response to the driving command received by the driving command reception section 48. The output limiting mode executing section 52 executes the output limiting mode in which the output of the electric motor 18 is made less than the output of the electric motor 18 in the normal mode, to protect the electric motor 18, the inverter 22, the battery 21, etc. The regenerative mode executing section 53 executes the regenerative mode to generate regenerative electric power by using the electric motor 18 as the generator. The output rapid-increase mode executing section 54 executes the output rapid-increase mode to compensate the motor output corresponding to the accelerator displacement amount such that it is greater than the motor output in the normal mode for a specified time, when rapid acceleration is commanded, that is, an increase rate of the accelerator displacement amount detected by the accelerator displacement amount sensor 37 is equal to or greater than a predetermined value.

Figure 3:
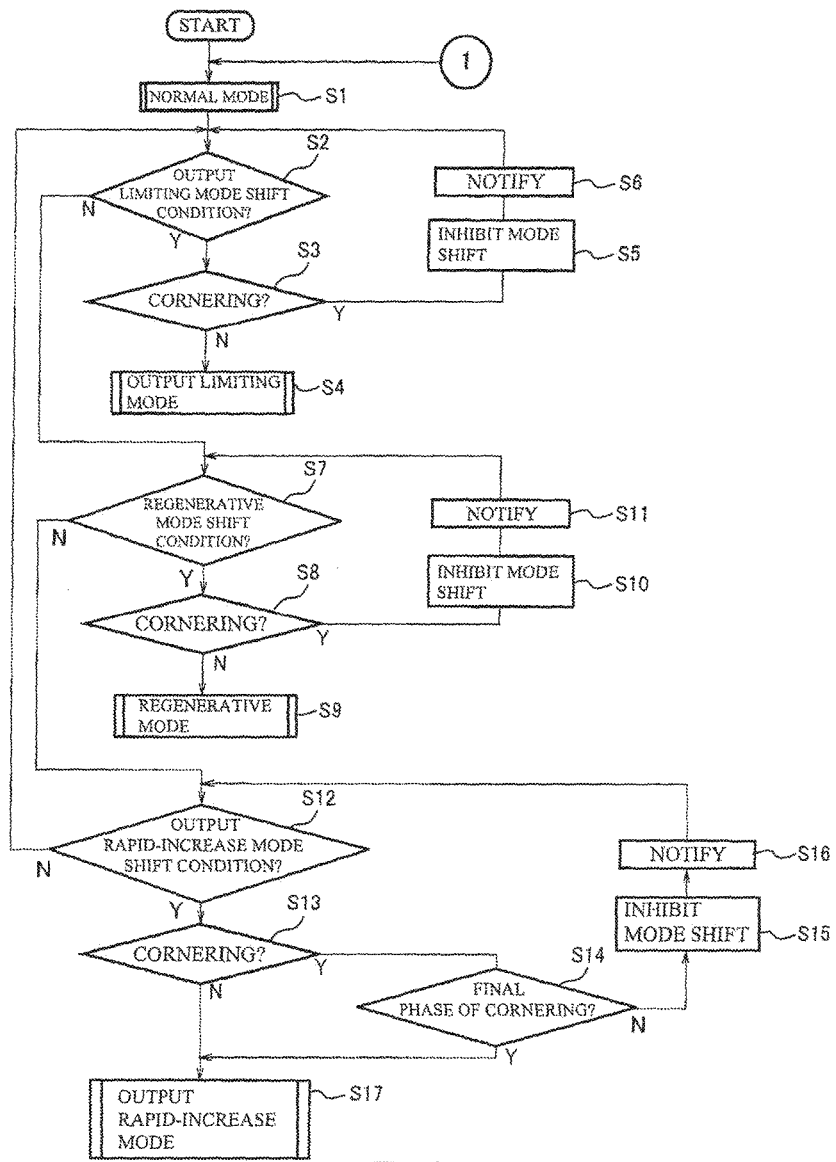
FIG. 3 is a flowchart for explaining control in the electric motorcycle of FIG. 2.
Figure 4:
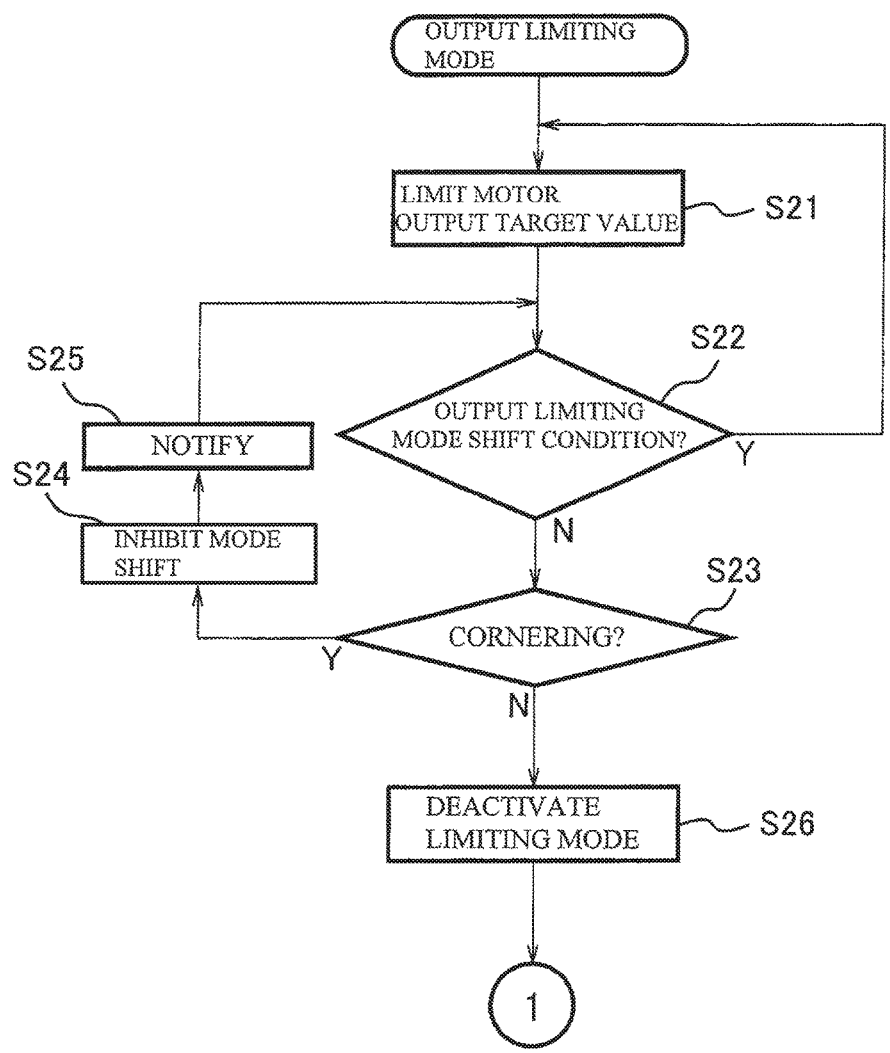
FIG. 4 is a flowchart for explaining an output limiting mode of FIG. 3.
Figure 5:
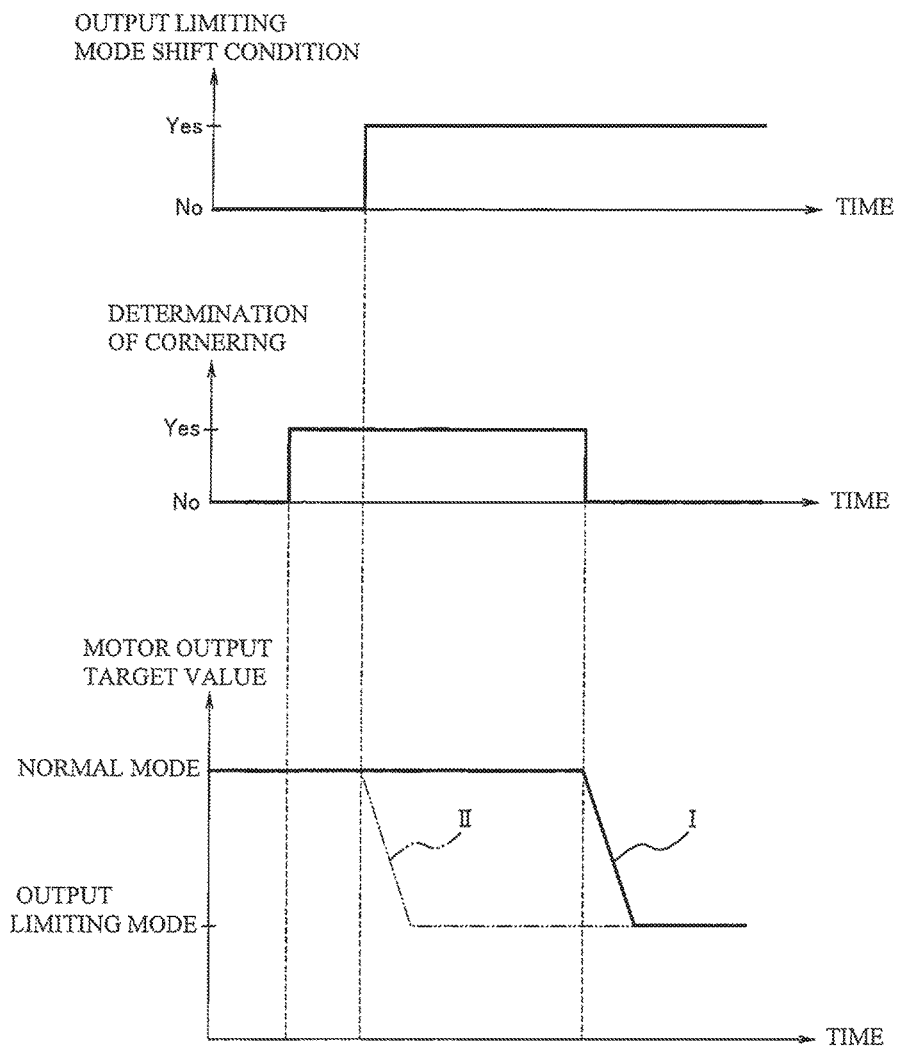
FIG. 5 is a graph relating to shift to the output limiting mode in the control of FIG. 3.
Figure 6:
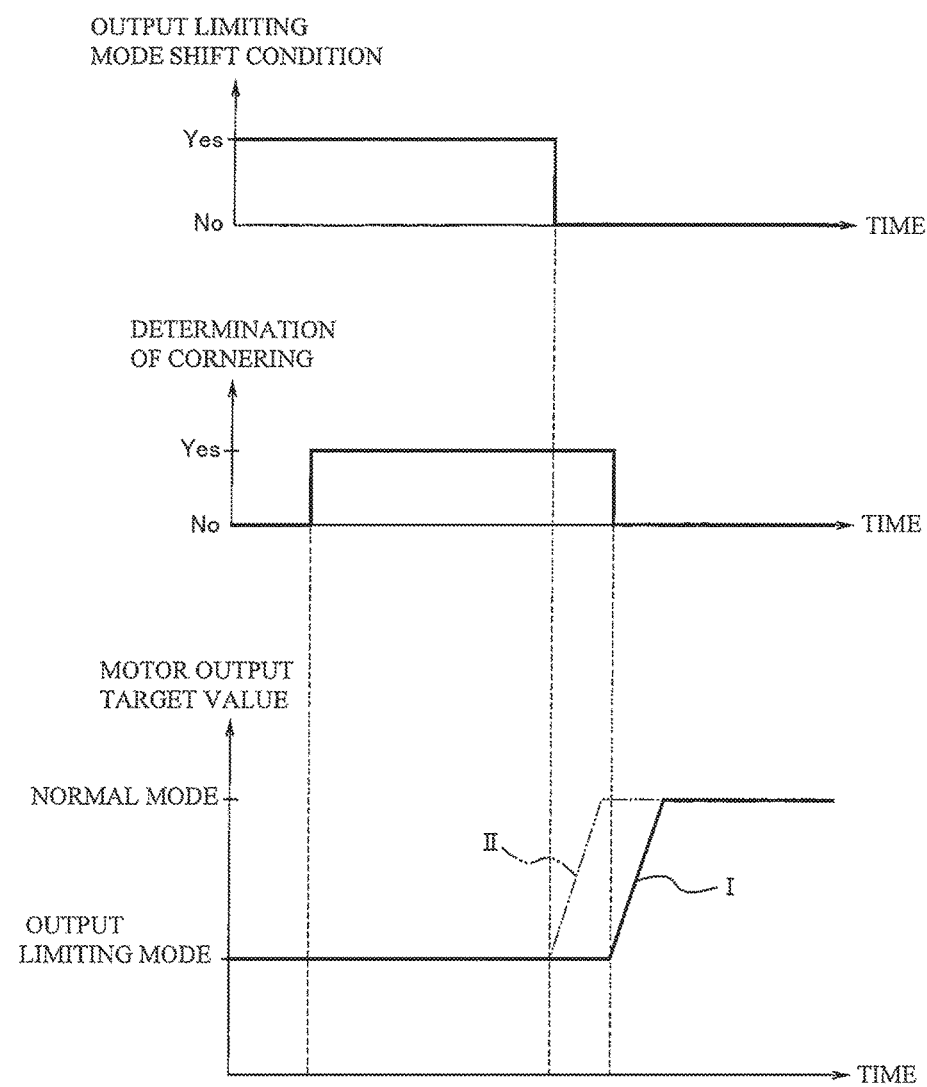
FIG. 6 is another graph relating to shift to the output limiting mode in the control of FIG. 3.

FIG. 3 is a flowchart for explaining control in the electric motorcycle 1 of FIG. 2. FIG. 4 is a flowchart for explaining the output limiting mode of FIG. 3. FIG. 5 is a graph relating to shift to the output limiting mode in the control of FIG. 3. FIG. 6 is another graph relating to shift to the output limiting mode in the control of FIG. 3. As shown in FIGS. 3 and 5, initially, when a power supply of the electric motorcycle 1 is ON, the mode shift control section 50 sets the driving mode to the normal mode (step S1). In this normal mode, the output of the electric motor 18 is controlled in response to the driving command received by the driving command reception section 48, and the output of the electric motor 18 is increased or decreased according to an increase or decrease in the accelerator displacement amount.

Then, the shift condition determiner section 47 determines whether or not the output limiting mode shift condition is satisfied (step S2). The output limiting mode shift condition includes a condition in which a state of the driving system electric device including the electric motor 18, the battery 21 and the inverter 22 has become a predetermined non-normal state different from the normal state, i.e., the state value received by the state value reception section 46 has become a predetermined non-normal value. More specifically, the output limiting mode shift condition includes a condition in which the temperature of the electric motor 18, the temperature of the battery 21 or the temperature of inverter 22 which is detected by any one of the temperature sensors 30 to 32, exceeds a predetermined allowable value, a condition in which the voltage detected by the battery voltage sensor 33 falls below a predetermined allowable value, a condition in which the SOC detected by the SOC sensor 34 falls below a predetermined allowable value, a condition in which the rotational speed detected by the rotational speed sensor 35 is equal to or higher than a predetermined upper limit rotational speed, a condition in which the vehicle speed detected by the vehicle speed sensor 36 is equal to or higher than a predetermined upper limit speed, and/or a condition in which an abnormality has been detected by the sensor abnormality detecting section 45.

When the shift condition determiner section 47 determines that the output limiting mode shift condition is not satisfied in step S2, the process moves to step S8. When the shift condition determiner section 47 determines that the output limiting mode shift condition is satisfied in step S2, the mode shift control section 50 determines whether or not the cornering determiner section 49 is determining that the electric motorcycle 1 is cornering (step S3). When the cornering determiner section 49 determines that the electric motorcycle 1 is not cornering (step S3: N), the electric motorcycle 1 automatically shifts to the output limiting mode such that a target value of the motor output gets gradually closer to a target value in the output limiting mode (step S4).

On the other hand, when the cornering determiner section 49 determines that the electric motorcycle 1 is cornering (step S3: Y), in the state in which the output limiting mode shift condition is satisfied (step S2: Y), the mode shift control section 50 inhibits the electric motorcycle 1 from shifting to the output limiting mode (step S5). As shown in FIG. 5, it is supposed that the target value of the motor output in the normal mode is constant. In this case, when the output limiting mode shift condition is satisfied and the electric motorcycle 1 is not cornering, the electric motorcycle 1 shifts to the output limiting mode which is the non-normal mode (two-dotted line II in FIG. 5). On the other hand, when the output limiting mode shift condition is satisfied and the electric motorcycle 1 is cornering, a target value of the motor output in the normal mode is not decreased to a target value in the output limiting mode, and is maintained as it is until the cornering finishes (solid line I in FIG. 5). This makes it possible to prevent a change in the output of the electric motor 18 which would be caused by the mode shift during the cornering. Therefore, in the electric motorcycle 1 which shifts from the normal mode to the output limiting mode based on the state value different from the driving command, driving feeling during the cornering can be improved. Concurrently with this, the mode shift control section 50 causes the notification device 55 to notify the driver that the mode shift is inhibited (step S6), and the process returns to step S2. This enables the driver to be notified that a change in the output of the electric motor 18 is suppressed. In this way, the driver can know a controlled state of the electric motorcycle 1.

Then, when the cornering determiner section 49 determines that the cornering of the electric motorcycle 1 has finished (step S3: N), in the state in which the output limiting mode shift condition is satisfied (step S2: Y), the electric motorcycle 1 automatically shifts to the output limiting mode such that the target value of the motor output gets gradually closer to the target value in the output limiting mode (step S4). Since the target value of the motor output is made to get gradually closer to the target value after the mode shift, during execution of the mode shift, the mode shift can be completed while keeping a good driving feeling.

As shown in FIG. 4, in the output limiting mode, the target value of the motor output is made less than the target value in the normal mode (step S21). Since the output of the electric motor 18 is thus decreased, for example, the electric motor 18, the battery 21 and/or the inverter 22 are protected, or the driving speed is decreased or the rotational speed is limited, when the discharge ability of the battery 21 is lowered, or an abnormality has occurred in the sensor. Then, the shift condition determiner section 47 determines whether or not the output limiting mode shift condition is satisfied (step S22). When the shift condition determiner section 47 determines that the output limiting mode shift condition is still satisfied, the process returns to step S21. When the shift condition determiner section 47 determines that the output limiting mode shift condition is not satisfied in step S21, the mode shift control section 50 determines whether or not the cornering determiner section 49 is determining that the electric motorcycle 1 is cornering (step S23). When the cornering determiner section 49 determines that the electric motorcycle 1 is cornering in step S23, the mode shift control section 50 inhibits the electric motorcycle 1 from returning (shifting) to the normal mode (step S24). Concurrently with this, the mode shift control section 50 causes the notification device 55 to notify the driver that the electric motorcycle 1 is inhibited from returning to the normal mode (step S25), and the process returns to step S22. When the cornering determiner section 49 determines that the cornering of the electric motorcycle 1 has finished (step S23: N), in the state in which the output limiting mode shift condition is not satisfied (step S22: N), the mode shift control section 50 deactivates the output limiting mode (step S26), and the electric motorcycle 1 shifts to the normal mode such that the target value of the motor output gets gradually closer to the target value in the normal mode (step S1).

As shown in FIG. 6, it is supposed that the electric motorcycle 1 is in the output limiting mode before it is determined that the electric motorcycle 1 is cornering. In this case, when the shift condition determiner section 47 determines that the output limiting mode shift condition is not satisfied and the cornering determiner section 49 determines that the electric motorcycle 1 is not cornering, the mode shift control section 50 deactivates the output limiting mode and shifts the electric motorcycle 1 to the normal mode (two-dotted line II in FIG. 6). On the other hand, when the shift condition determiner section 47 determines that the output limiting mode shift condition is not satisfied and the cornering determiner section 49 determines that the electric motorcycle 1 is cornering, a target value of the motor output in the output limiting mode is not increased to a target value in the normal mode, and is maintained as it is until the cornering finishes (solid line I in FIG. 6). Therefore, in the electric motorcycle 1 which shifts from the output limiting mode to the normal mode based on the state value different from the driving command, driving feeling during the cornering can be improved. Then, when the cornering determiner section 49 determines that the cornering has finished (step S23: N), in the state in which the output limiting mode shift condition is not satisfied (step S22: Y), the mode shift control section 50 deactivates the output limiting mode such that the target value of the motor output gets gradually closer to the target value in the normal mode (step S26), and thus the electric motor 1 automatically shifts to the normal mode (step S1).

Figure 7:
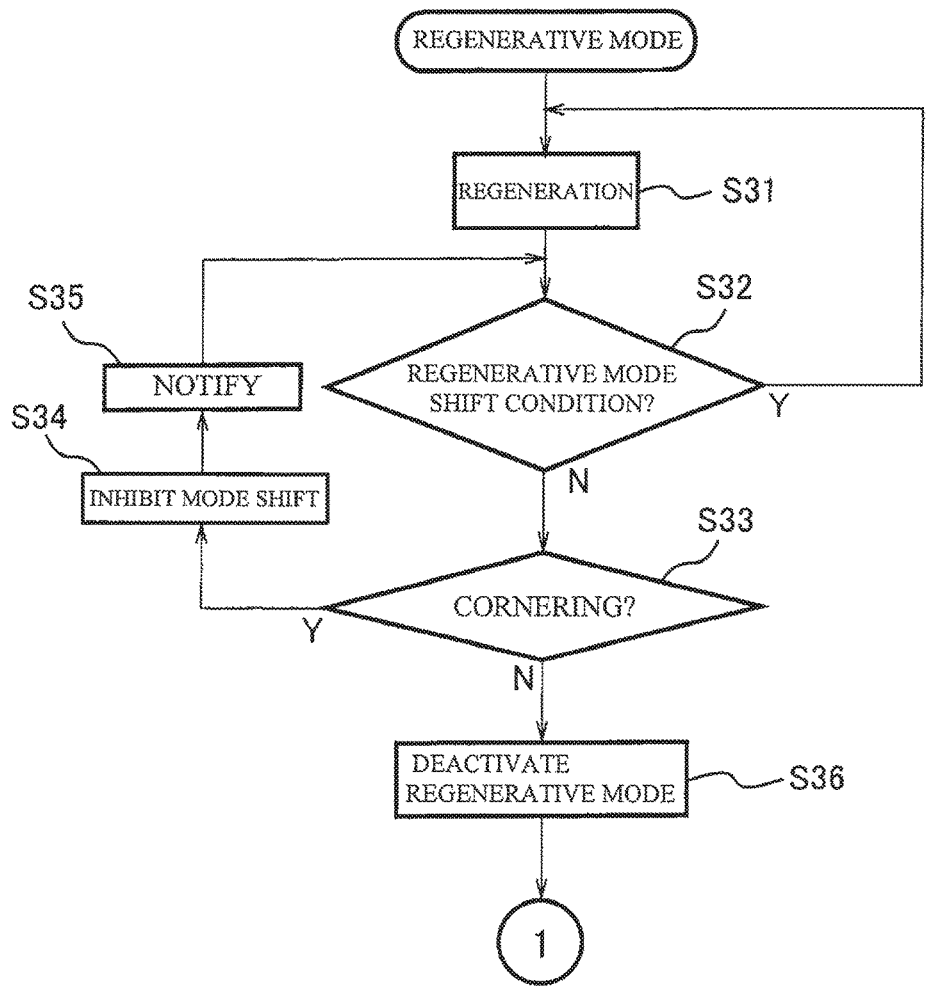
FIG. 7 is a flowchart for explaining a regenerative mode of FIG. 3.
Figure 8:
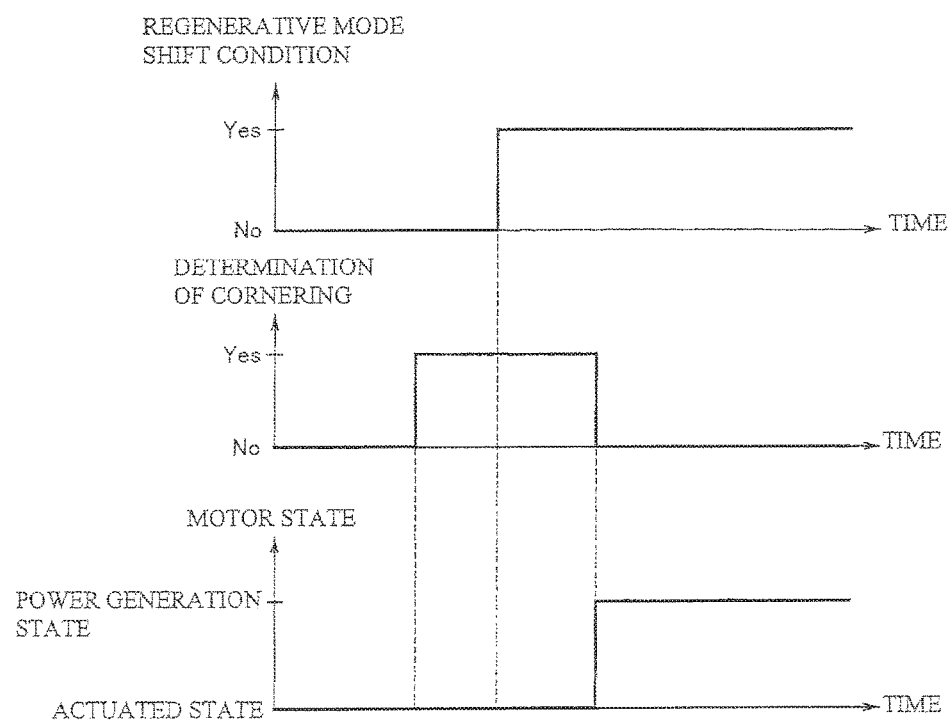
FIG. 8 is a graph relating to shift to the regenerative mode in the control of FIG. 3.
Figure 9:
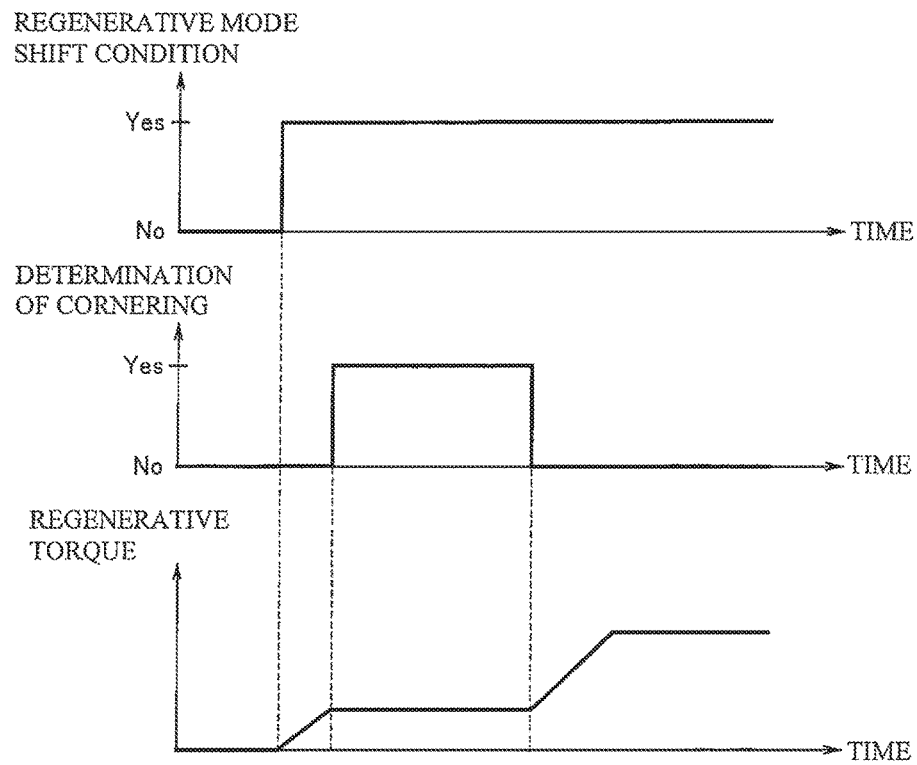
FIG. 9 is another graph relating to shift to the regenerative mode in the control of FIG. 3.

FIG. 7 is a flowchart for explaining a regenerative mode of FIG. 3. FIG. 8 is a graph relating to shift to the regenerative mode in the control of FIG. 3. FIG. 9 is another graph relating to shift to the regenerative mode in the control of FIG. 3. As shown in FIGS. 3 and 7, in step S7, the shift condition determiner section 47 determines whether or not a regenerative mode shift condition is satisfied. The regenerative mode shift condition is set such that both an enable condition for enabling a regenerative operation and a start condition for starting the regenerative operation are satisfied. The enable condition is an electric condition of an electric device relating to the regenerative operation, for example, a condition in which the battery satisfies a predetermined chargeable state. Specifically, the enable condition includes a condition in which the temperature of the battery 21 which is detected by the battery temperature sensor 32 is within a predetermined allowable range, a condition in which the voltage detected by the battery voltage sensor 33 is equal to or less than a predetermined value, and/or a condition in which the SOC detected by the SOC sensor 34 is equal to or less than a predetermined value. The start condition is, for example, a condition in which a wheel rotated by a friction on a road surface satisfies a state in which it applies driving power to a motor output shaft. Specifically, the start condition includes a condition in which the clutch switch 39 detects the engaged state of the clutch 20, and it is determined that the vehicle is decelerated based on the information from at least one of the rotational speed sensor 35, the vehicle speed sensor 36, the accelerator displacement amount sensor 37 and the brake sensor 38, a stop command condition (regeneration start command) input by the driver to stop generation of torque in the motor, etc.

When the shift condition determiner section 47 determines that the regenerative mode shift condition is not satisfied in step S7, the process moves to step S12. When the shift condition determiner section 47 determines that the regenerative mode shift condition is satisfied in step S7, the mode shift control section 50 determines whether or not the cornering determiner section 49 is determining that the electric motorcycle 1 is cornering (step S8). When the cornering determiner section 49 determines that the electric motorcycle 1 is cornering in step S8, the mode shift control section 50 inhibits the electric motorcycle 1 from shifting to the regenerative mode (step S10). As a result, even when the regenerative mode shift condition is satisfied, the electric motor 18 does not shift to a power generation state but maintains an actuated state. This makes it possible to prevent a situation in which the electric motorcycle 1 shifts to the regenerative mode during the cornering, negative torque is generated in the electric motor 18 due to generation of electric power, and as a result, the motor output changes greatly. Concurrently with this, the mode shift control section 50 causes the notification device 55 to notify the driver that the mode shift is inhibited (step S11), and the process returns to step S7.

Then, when the cornering determiner section 49 determines that the cornering of the electric motorcycle 1 has finished (step S8: N), in the state in which the regenerative mode shift condition is satisfied (step S7: Y), the electric motorcycle 1 automatically shifts to the regenerative mode (step S9). As shown in FIG. 7, in the regenerative mode, the electric motor 18 is changed from the actuated state to the power generation state, the electric motor 18 converts kinetic energy transmitted from the rear wheel 3 by driving inertia into electric energy to charge the battery 21 (step S31).

Then, the shift condition determiner section 47 determines whether or not the regenerative mode shift condition is satisfied (step S32). When the shift condition determiner section 47 determines that the regenerative mode shift condition is still satisfied, the process returns to step S31. When the shift condition determiner section 47 determines that the regenerative mode shift condition is not satisfied in step S32, the mode shift control section 50 determines whether or not the cornering determiner section 49 is determining that the electric motorcycle 1 is cornering (step S33). When the cornering determiner section 49 determines that the electric motorcycle 1 is cornering in step S33, the mode shift control section 50 inhibits the electric motorcycle 1 from returning (shifting) to the normal mode (step S34). Concurrently with this, the mode shift control section 50 causes the notification device 55 to notify the driver that the electric motorcycle 1 is inhibited from returning to the normal mode (step S35), and the process returns to step S32. Then, when the cornering determiner section 49 determines that the cornering of the electric motorcycle 1 has finished (step S33: N), in the state in which the regenerative mode shift condition is not satisfied (step S32: N), the mode shift control section 50 deactivates the regenerative mode, returns the electric motor 18 from the power generation state to the actuated state (step S36), and shifts the electric motorcycle 1 to the normal mode (step S1).

As shown in FIG. 9, it is supposed that the cornering determiner section 49 determines that the cornering has started, when the regenerative mode shift condition is satisfied, the electric motor 1 starts to shift to the regenerative mode, and regenerative torque is increasing. In this case, to suppress a change in the torque during the cornering, an increase in the regenerative torque during the cornering may be suppressed. For example, the regenerative torque during the cornering may be made substantially constant. In that case, then, when the cornering determiner section 49 determines that the cornering has finished in the state in which the regenerative mode shift condition is satisfied, the regenerative torque may be made to get gradually closer to a target regenerative torque.

Figure 10:
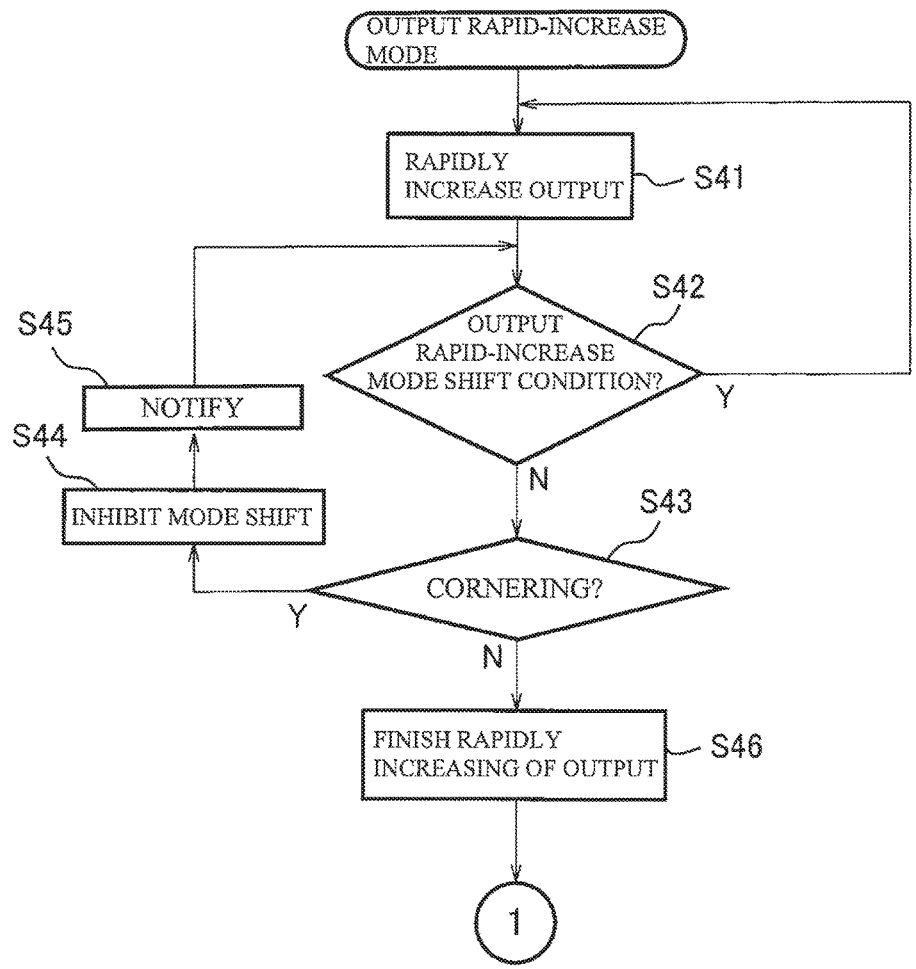
FIG. 10 is a flowchart for explaining an output rapid-increase mode of FIG. 3.
Figure 11:
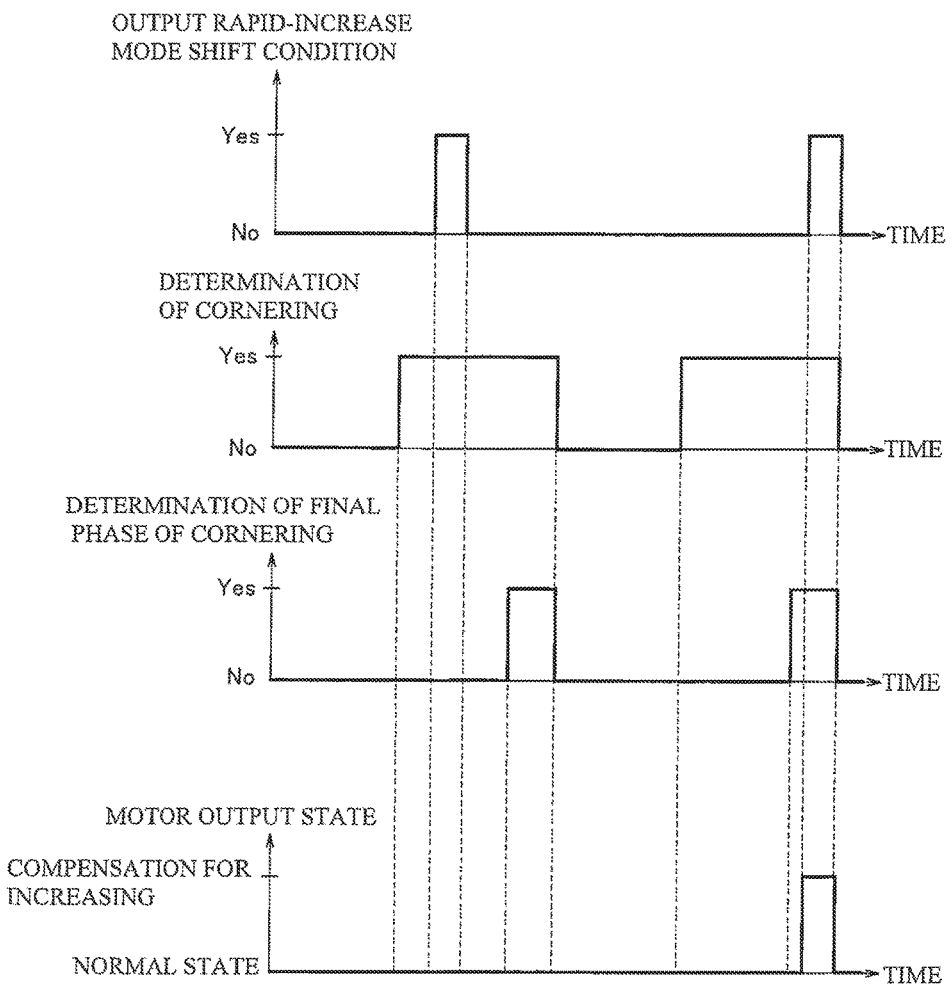
FIG. 11 is a graph relating to shift to the output rapid-increase mode in the control of FIG. 3.

FIG. 10 is a flowchart for explaining an output rapid-increase mode of FIG. 3. FIG. 11 is a graph relating to shift to the output rapid-increase mode in the control of FIG. 3. As shown in FIGS. 3 and 10, in step S14, the shift condition determiner section 47 determines whether or not an output rapid-increase mode shift condition is satisfied in step S14. The output rapid-increase mode shift condition is set such that both an enable condition for enabling an output rapid-increase operation and a start condition for starting the output rapid-increase operation are satisfied. The enable condition is an electric condition of an electric device relating to the output rapid-increase operation, for example, a condition in which the battery satisfies a predetermined chargeable state. Specifically, the enable condition includes a condition in which the temperature of the battery 21 which is detected by the battery temperature sensor 32 is within a predetermined allowable range, a condition in which the voltage detected by the battery voltage sensor 33 is equal to or less than a predetermined value, and/or a condition in which the SOC detected by the SOC sensor 34 is equal to or less than a predetermined value. The start condition is, for example, a condition in which a command for rapidly increasing the output which is input by the driver is directly or indirectly obtained. Specifically, the start condition includes a condition in which the accelerator grip 7 is operated to rapidly accelerate the electric motorcycle 1, i.e., a condition in which an increase rate of the accelerator displacement amount detected by the accelerator displacement amount sensor 37 is equal to or greater than a predetermined value. Instead of the operation of the accelerator grip 7 for rapidly accelerating the electric motorcycle 1, the start condition may be a special operation which is an operation of a rapid acceleration switch, or an operation of the accelerator in the disengaged state of the clutch.

When the shift condition determiner section 47 determines that the output rapid-increase mode shift condition is not satisfied in step S12, the process returns to step S2. When the shift condition determiner section 47 determines that the output rapid-increase mode shift condition is satisfied in step S12, the mode shift control section 50 determines whether or not the cornering determiner section 49 is determining that the electric motorcycle 1 is cornering (step S13). When the cornering determiner section 49 determines that the electric motorcycle 1 is cornering in step S13, the mode shift control section 50 further determines whether or not the cornering determiner section 49 is determining that the electric motorcycle 1 has reached a final phase of the cornering (step S14). Specifically, the cornering determiner section 49 also acts as a corner end determiner section for determining whether or not the electric motorcycle 1 has reached a final phase of the cornering, i.e., the electric motor 1 is about to reach the end of the corner. For example, when an increase rate of the bank angle detected by the bank angle sensor 41 changes from a positive value to a negative value, and/or the accelerator displacement amount increases during the cornering, the cornering determiner section 49 determines that the electric motorcycle 1 has reached the final phase of the cornering.

When the cornering determiner section 49 determines that the electric motorcycle 1 has not reached the final phase of the cornering in step S16, the mode shift control section 50 inhibits the electric motorcycle 1 from shifting to the output rapid-increase mode (step S15). Therefore, as shown in FIG. 11, the normal mode is maintained. This makes it possible to prevent a situation in which the electric motorcycle 1 shifts to the output rapid-increase mode and the output rapid-increase condition is satisfied during the cornering, the motor output is compensated to be increased such that a change in the motor output increases. Concurrently with this, the mode shift control section 50 causes the notification device 55 to notify the driver that the mode shift is inhibited (step S16), and the process returns to step S12. Then, when the cornering determiner section 49 determines that the electric motorcycle 1 is not cornering (step S13: N) in the state in which the output rapid-increase mode shift condition is satisfied (step S12: Y), the mode shift control section 50 shifts the electric motorcycle 1 to the output rapid-increase mode (step S17). Or, when the the cornering determiner section 49 determines that the electric motorcycle 1 has reached the final phase of the cornering (step S14: Y) in the state in which the output rapid-increase mode shift condition is satisfied (step S12: Y), the mode shift control section 50 shifts the electric motorcycle 1 to the output rapid-increase mode (step S17). According to this, when the electric motorcycle 1 has reached the final phase of the cornering, the compensation for increasing the motor output is not inhibited and a great acceleration is allowed. Therefore, accelerated driving smoothly occurs at the end of the corner.

As shown in FIGS. 10 and 11, the motor output is compensated to be increased such that the motor output in a correspondence between the accelerator displacement amount and the motor output in the output rapid-increase mode is greater than that in the normal mode (step S41). Thus, when the accelerator displacement amount is rapidly increased, the motor output becomes greater than that in the normal mode for a specified time, which causes a greater acceleration than that in the normal mode for a moment. In this way, an acceleration response felt by the driver is improved.

Then, the shift condition determiner section 47 determines whether or not the output rapid-increase mode shift condition is satisfied (step S42).When the shift condition determiner section 47 determines that the output rapid-increase mode shift condition is still satisfied, the process returns to step S41. When the shift condition determiner section 47 determines that the output rapid-increase mode shift condition is not satisfied in step S42, the mode shift control section 50 determines whether or not the cornering determiner section 49 is determining that the electric motorcycle 1 is cornering (step S43). When the cornering determiner section 49 determines that the electric motorcycle 1 is cornering in step S43, the mode shift control section 50 inhibits the electric motorcycle 1 from returning (shifting) to the normal mode (step S44). Concurrently with this, the mode shift control section 50 causes the notification device 55 to notify the driver that the electric motorcycle 1 is inhibited from returning to the normal mode (step S45), and the process returns to step S42. Then, when the cornering determiner section 49 determines that the electric motorcycle 1 is not cornering (step S43: N), in the state in which the output rapid-increase mode shift condition is not satisfied (step S42: N), the mode shift control section 50 finishes rapidly increasing of the motor output (step S46), and shifts the electric motorcycle 1 to the normal mode (step S1).

As described above, in the present embodiment, during the cornering, by inhibiting the motor output from changing based on the information different from the driving command, the driving feeling during the cornering can be improved. Especially, in the motorcycle which is a vehicle performing cornering with the vehicle body banked by shifting the driver's weight, changing of the motor output based on the information different from the driving command is prevented, which significantly improves the driving feeling during the cornering. Specifically, even when it is determined that an abnormality has occurred in the electric device relating to driving of the vehicle, such as the electric motor, the battery or the inverter, during the cornering, the motor output is maintained until the cornering has finished, and occurrence of a change in the motor output is prevented during the cornering. Thus, a good driving feeling can be maintained during the cornering. In addition, after the cornering has finished, limiting of the motor output is executed to correspond to the abnormality occurring in the electric device. This makes it possible to protect the electric device, perform driving with the motor output suppressed as corresponding to the abnormality, etc., while lessening an influence on the driving feeling during limiting of the motor output. In the same manner, even when it is determined that the abnormal state of the electric device is obviated in the middle of the cornering, the output limiting mode is maintained until the cornering finishes to prevent a situation in which the motor output increases during the cornering. As a result, a good driving feeling can be maintained during the cornering.

It should be noted that limiting of the change in the motor output during the cornering is performed only based on the information different from the driving command. Therefore, even during the cornering, the output of the vehicle can be changed according to the driver's intention, and the driver can easily input the driving command, or the like, as desired. In addition, the change in the motor output due to starting/finishing of the regenerative operation and the change in the motor output due to starting/finishing of permitting the output to be rapidly increased are inhibited during the cornering, and thus, good driving feeling can be maintained as well. In exceptional cases, at the final phase of the cornering, the driving operation according to the driver's demand can be attained by permitting execution of an output rapid-increase permission mode in response to the driver's demand.

Figure 12:
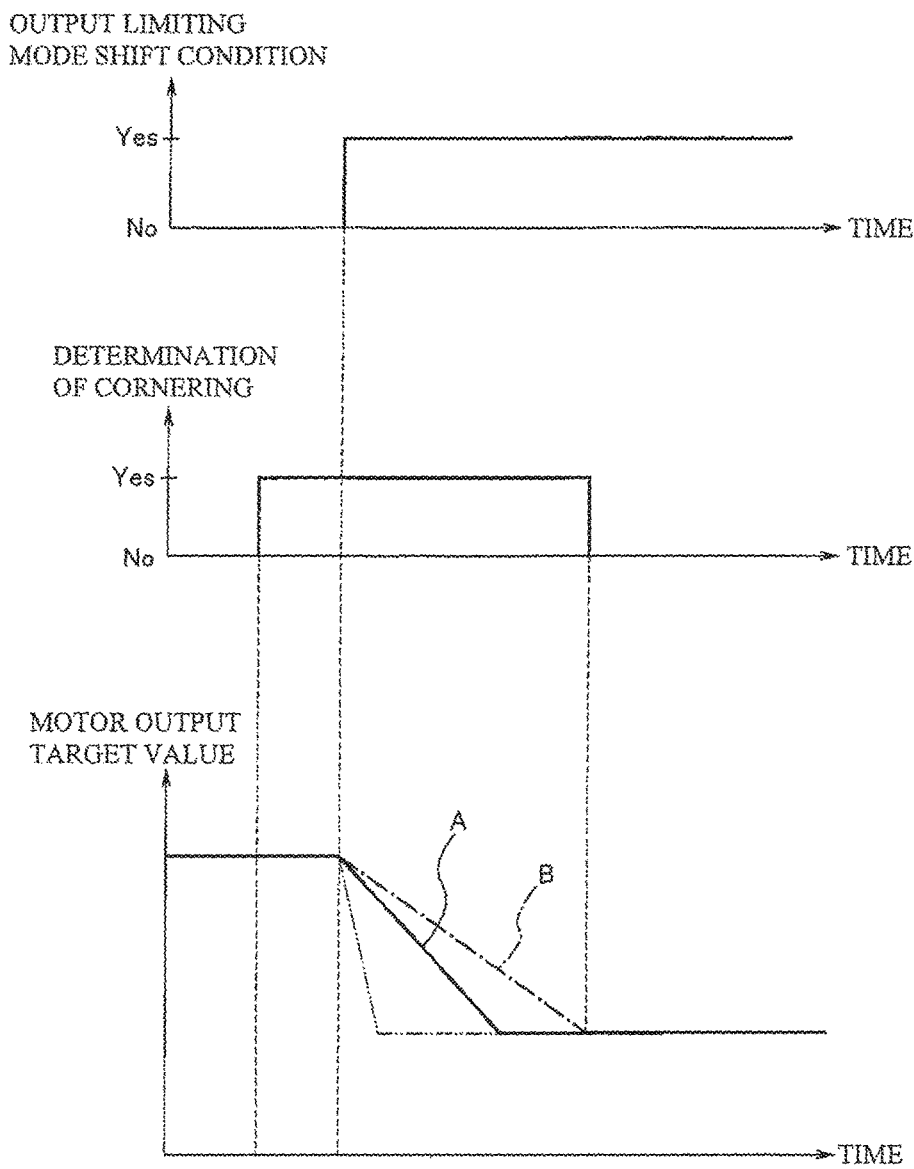
FIG. 12 is a graph relating to shift to the output limiting mode according to modified example 1, corresponding to FIG. 8.
Figure 13:
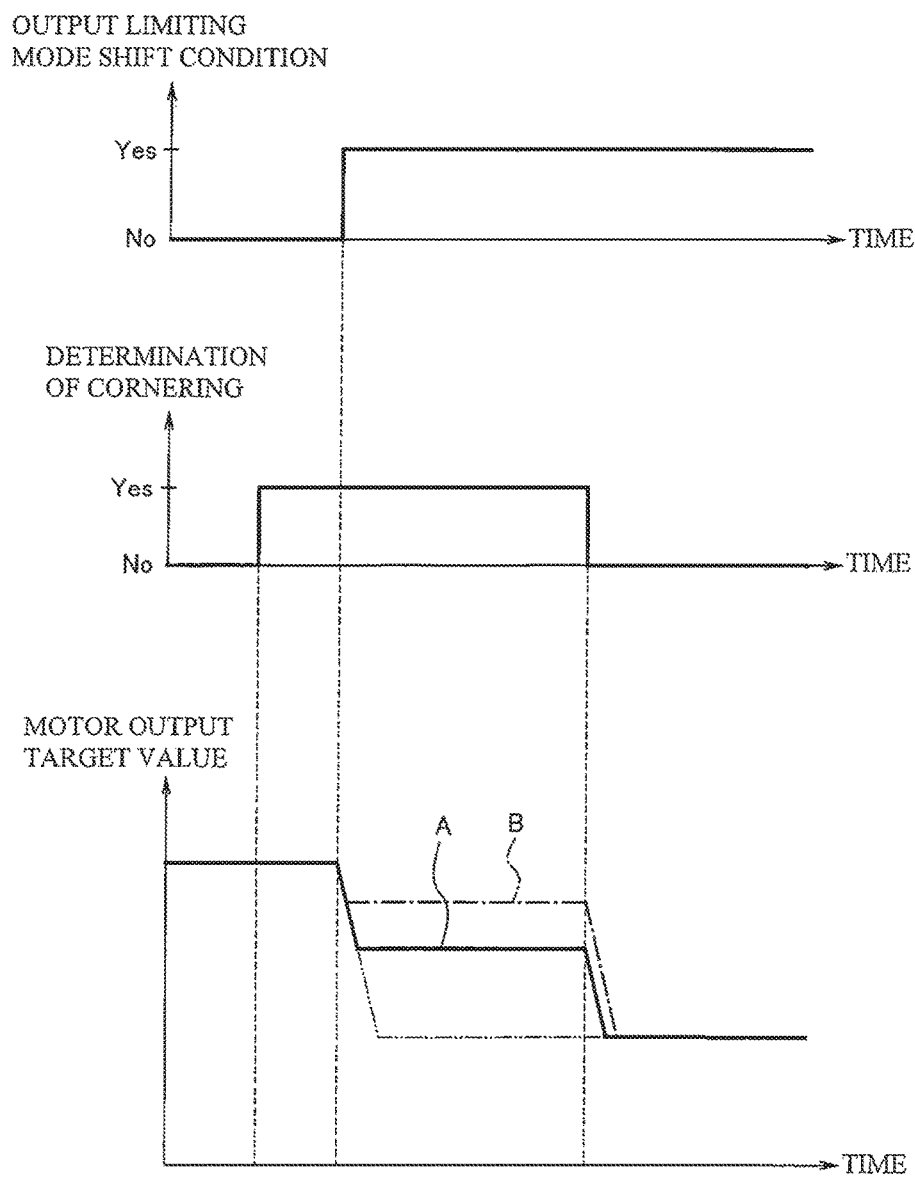
FIG. 13 is a graph relating to shift to the output limiting mode according to modified example 2, corresponding to FIG. 8.

FIG. 12 is a graph relating to shift to the output limiting mode according to modified example 1, corresponding to FIG. 8. FIG. 13 is a graph relating to shift to the output limiting mode according to modified example 2, corresponding to FIG. 8. In the above described embodiment, as shown in FIGS. 3 and 5, in step S5 (FIG. 3), the mode shift is inhibited. Alternatively, as indicated by a solid line A of FIG. 12, the change in the output of the electric motor 18 may be suppressed in such a way that a change rate of the motor output which occurs with time is made less, when it is determined that the mode shift condition is satisfied and it is determined that the electric motorcycle 1 is cornering, than when it is determined that the mode shift condition is satisfied and it is determined that the electric motorcycle 1 is not cornering. This makes it possible to lessen the change rate of the output of the electric motor 18 during execution of the mode shift. Therefore, it becomes possible to suppress the change in the output of the electric motor 18 which is caused by the mode shift, during execution of the mode shift. In a further alternative, when it is determined that the electric motorcycle 1 is cornering and the mode shift condition is satisfied, a change amount of the output of the electric motor 18 may be reduced as indicated by a solid line A of FIG. 13. This makes it possible to reduce the change amount of the output of the electric motor 18 during execution of the mode shift. Therefore, it becomes possible to suppress the change in the output of the electric motor 18 which is caused by the mode shift, during execution of the mode shift.

By suppressing the change in the motor output as in modified example 1 and in modified example 2, instead of inhibiting the change in the motor output, it become possible to achieve the advantages of the present invention that the driving feeling is prevented from getting worse. In the inventions of the modified examples, changing of the motor output is executed while mitigating the change in the motor output during the cornering. Thus, even during the cornering, the advantages provided by changing of the motor output can also be attained. For example, the electric device can be protected, kinetic energy can be converted into electric energy, etc., even though its changing magnitude or its change which occurs with time may be less during the cornering than during non-cornering.

As indicated by the one-dotted line B in FIGS. 12 and 13, the mode shift control section 50 may change a degree to which the change in the output of the electric motor 18 is suppressed may be varied according to vehicle driving state(s) (at least one of bank angle, motor rotational speed, vehicle speed, gear ratio, corner curvature) during the cornering. For example, during a vehicle driving state in which a change in the driving power affects the driver less, the degree to which the change in the output of the electric motor 18 is suppressed is made less (solid line A in FIGS. 12 and 13). On the other hand, during a vehicle driving state in which a change in the driving power affects the driver more, the degree to which the change in the output of the electric motor 18 is suppressed is made greater, than during the vehicle driving state in which a change in the driving power affects the driver less (one-dotted line B in FIGS. 12 and 13). In other words, a change rate of the output of the electric motor 18, which occurs with time, may be made less, as the vehicle driving state approaches the state in which a change in the driving power affects the driver more, than when it is determined that the mode shift condition is satisfied and it is determined that the electric motorcycle 1 is not cornering. Or, for example, during the vehicle driving state in which a change in the driving power affects the driver less, the change in the output of the electric motor 18 may not be suppressed, while during the vehicle driving state in which a change in the driving power affects the driver more, the change in the output of the electric motor 18 may be suppressed. For example, when the bank angle detected by the bank angle sensor 41 is less than a first predetermined bank angle, the motor rotational speed detected by the rotational speed sensor 35 is equal to or more than a first predetermined rotational speed, the vehicle speed detected by the vehicle speed sensor 36 is equal to or greater than a first predetermined vehicle speed, the reduction gear ratio of the gear position detected by the gear position sensor 40 is less than a predetermined value, and/or the corner curvature is less than a predetermined value, it may be determined that the vehicle driving state is the vehicle driving state in which a change in the driving power affects the driver less. By doing so, a lane change or the like can be performed quickly when the degree to which the change in the motor output is suppressed is made less. In this way, it becomes possible to achieve advantages provided by control for the mode shift and improvement of driving feeling during the cornering.

Although in the present embodiment, the cornering determiner section 49 determines whether or not the electric motorcycle 1 is cornering based on the information from the bank angle sensor 41, this may be performed by another method. For example, the cornering determiner section 49 may determine that the electric motorcycle 1 is cornering when a steering angle detected by a steering angle sensor is greater than a predetermined value, when a lateral acceleration detected by a lateral acceleration sensor is greater than a predetermined value, or a lateral vehicle body bank angle detected by a gyro sensor is greater.

Or, the cornering determiner section 49 may determine whether or not the electric motorcycle 1 is cornering based on a difference between a front wheel rotational speed and a rear wheel rotational speed. To be in more detail, in a case where a wheel width and a cross-sectional radius are different between the front wheel and the rear wheel, a speed difference between the front wheel and the rear wheel changes as the cornering of the vehicle body occurs. Therefore, the cornering determiner section 49 can determine whether or not the vehicle body is cornering based on a value relating to the speed difference between the front wheel and the rear wheel. For example, in the case where the rotational speed of the front wheel is greater than that of the rear wheel by a predetermined value or more, the cornering determiner section 49 may determine that the vehicle body is cornering.

Although in the present embodiment, the cornering determiner section 49 may determine that the electric motorcycle 1 is cornering when the bank angle of the vehicle body from the upright state is equal to or greater than the predetermined angle, the present invention is not limited to this. The cornering determiner section 49 may determine that the electric motorcycle 1 is cornering when the electric motorcycle 1 is slalom-driving in which the cornering occurs plural times in succession. In this case, when the cornering is the slalom-driving, the cornering determiner section 49 may determine that the cornering has finished when the slalom-driving has finished. For example, the cornering determiner section 49 may determine that the cornering has finished when specified time, for example, 1 second passes after the bank angle has become less than a predetermined value. This makes it possible to avoid misdetermination that the cornering has finished when the electric motorcycle 1 is placed in the upright state for a moment during the slalom-driving. Or, the cornering determiner section 49 may determine that the electric motorcycle 1 is slalom-driving in a case where time taken for the bank angle to change to a value less than a predetermined value is short. Or, the cornering determiner section 49 may determine whether or not the electric motorcycle 1 is slalom-driving, by another method. As a matter of course, a case where the slalom-driving is not included is within the scope of the present invention.

Although in the present invention, the change in the motor output during the cornering is suppressed in both the case where the motor output is reduced and the case where the motor output is increased, the present invention is not limited to this. The change in the motor output may be suppressed during the cornering in either one the case where the motor output is reduced and the case where the motor output is increased, which is also within the scope of the present invention. Although in the present embodiment, the change in the motor output is suppressed for the three output change modes, which are the output limiting mode, the regenerative mode, and the output rapid-increase mode, during the cornering, this need not be performed for all of the three output change modes, and may be performed for at least one of the three output change modes. Although in the present embodiment, the output limiting mode, the regenerative mode, and the output rapid-increase mode, occur in this order from starting of the control, these three modes may occur in a different order, which is also within the scope of the present invention. Furthermore, examples of the driving mode shift described in the present embodiment are merely exemplary. The present invention is applicable so long as the driving mode is varied based on the information different from the command input by the driver. That is, examples of mode shift to driving modes, which are other than those in the present embodiment, are also within the scope of the present invention. Examples of the driving mode shift may include driving mode shift associated with adjustment of regenerative force, limitation of the torque, limitation of the rotational speed, and limitation of the driving speed, according to the driving state.

Although in the example of FIG. 5, the mode shift is inhibited when the output limiting mode shift condition is satisfied in the state in which it is determined that the electric motorcycle 1 is cornering, the mode shift may be halted and the change in the motor output due to the mode shift may be suppressed at a time point when it is determined that the electric motorcycle 1 is cornering (has started cornering), in the middle of shifting to the output limiting mode after the output limiting mode shift condition is satisfied, and then the mode shift may be completed after the cornering has finished. Also, a driving source of the vehicle is not limited to the electric motor 18 but may be an engine. Also, the vehicle is not limited to the motorcycle, and is applicable to vehicles such as a four-wheeled vehicle and a personal watercraft. The present invention is suitably used in a vehicle in which its body is banked during the cornering. Although in the present embodiment, the motor output is suppressed during the cornering, whether or not the motor output is suppressed during the cornering may be made different between a first state in which driving feeling is regarded as important and a second state in which protection of the electric device(s) is regarded as important. That is, in the first state, the motor output is not suppressed during the cornering, while in the second state, the motor output is suppressed during the cornering.

In the present embodiment, when the cornering finishes under the state the mode shift is inhibited because the electric motorcycle 1 is cornering, the motor output is made to get gradually closer to the target value after the mode shift. Alternatively, this may be performed quickly. Or, the output limiting mode may be deactivated according to the driver's intentions. For example, a switch for inputting a command for deactivating the output limiting mode may be provided, and the output limiting mode may be deactivated in response to the command input by the driver's operation of the switch. This can improve convenience. Or, setting for changing of limiting (suppressing) of the motor output, a threshold at which the electric motorcycle 1 enters the limiting mode, or the like, may be configured to be variable.

As a method of determining whether or not the electric motorcycle 1 has reached the final phase of the cornering, it may be determined that the electric motorcycle 1 has reached the final phase of the cornering, when the bank angle (steering angle) is reduced, a change in the bank angle (steering angle) is reduced, a change in the bank angle (steering angle) is reversed, gear change is performed, the clutch is operated, the accelerator is operated, etc., after it is determined that the electric motorcycle 1 is cornering. As the motor output to be controlled, a motor rotational speed may be used instead of the motor torque. Moreover, the present invention is not limited to the above described embodiment, and its configuration may be changed, added or deleted without departing from the spirit of the invention.

INDUSTRIAL APPLICABILITY

As described above, an electric motorcycle, a vehicle controller and a vehicle control method of the present invention have remarkable advantages that it is possible to improve the driving feeling during cornering in a vehicle in which a driving mode shifts based on a state value different from a driving command, and are effectively applicable to vehicles such as an electric motorcycle which can attain the advantages.

REFERENCE CHARACTERS LIST 1 electric motorcycle (vehicle)
18 electric motor
21 battery
22 inverter
23 ECU (control device, vehicle controller)
30 temperature sensor (state value detecting device)
31 inerter temperature sensor (state value detecting device)
32 battery temperature sensor (state value detecting device)
33 battery voltage sensor (state value detecting device)
34 SOC sensor (state value detecting device)
35 rotational speed sensor (state value detecting device)
36 vehicle speed sensor (state value detecting device)
37 accelerator displacement amount sensor (driving command detecting device)
38 brake sensor (driving command detecting device)
39 clutch switch (driving command detecting device)
40 gear position sensor (driving command detecting device)
41 bank angle sensor
45 sensor abnormality detecting section (state value detecting device)
48 driving command reception section
46 state value reception section
49 cornering determiner section
50 mode shift control section
51 normal mode executing section
52 output limiting mode executing section (non-normal mode executing section)
53 regenerative mode executing section (non-normal mode executing section)
54 output rapid-increase mode executing section (non-normal mode executing section)
55 notification device

The invention claimed is:

1. An electric motorcycle comprising:
a driving command sensor configured to detect a driving command input by a driver;
a state value sensor configured to detect a state value different from the driving command input;
a cornering sensor configured to determine whether or not the electric motorcycle is cornering;
an electric motor configured to generate driving power transmitted to a drive wheel; and
a processor configured to execute (a) normal mode for controlling an output of the electric motor in response to the driving command input detected by the driving command sensor, and (b) a regenerative mode for generating regenerative electric power by using the electric motor as a generator,
wherein the processor is configured to shift the electric motorcycle from one of the normal mode and the regenerative mode to the other of the normal mode and the regenerative mode when the state value detected by the state value sensor satisfies a predetermined shift condition while the electric motorcycle is in the one of the normal mode and the regenerative mode, and
wherein the processor causes a change in the output of the electric motor to be less when the cornering sensor determines that the electric motorcycle is cornering while the processor determines that the predetermined shift condition is satisfied than when the cornering sensor determines that the electric motorcycle is not cornering while the processor determines that the predetermined shift condition is satisfied.

2. The electric motorcycle according to claim 1, wherein the processor inhibits the electric motorcycle from shifting from the one of the normal mode and the regenerative mode to the other of the normal mode and the regenerative mode when the cornering sensor determines that the electric motorcycle is cornering while the predetermined shift condition is satisfied.

3. The electric motorcycle according to claim 1, wherein the cornering sensor comprises a bank angle sensor which detects a vehicle body bank angle formed when a vehicle body of the electric motorcycle is banked laterally from its upright state,
wherein the cornering sensor determines that the electric motorcycle is cornering when the vehicle body bank angle which is detected by the bank angle sensor is equal to or greater than a predetermined angle.

4. The electric motorcycle according to claim 1,
wherein the predetermined shift condition includes an enable condition for enabling a regenerative operation, the enable condition including one or more of the following:
a first enable condition in which a temperature of a battery of the electric motorcycle which is detected by a battery temperature sensor is within a predetermined allowable range,
a second enable condition in which a voltage of the battery of the electric motorcycle which is detected by a battery voltage sensor is equal to or less than a first predetermined value, and
a third enable condition in which a state of charge (SOC) of the battery of the electric motorcycle which is detected by a SOC sensor is equal to or less than a second predetermined value.

5. The electric motorcycle according to claim 1,
wherein the predetermined shift condition includes a start condition for starting a regenerative operation, the start condition including one or more of the following:
  a first start condition in which a clutch switch detects an engaged state of a clutch of the electric motorcycle,
  a second start condition in which it is determined that the electric motorcycle is decelerated based on information from at least one of the following sensors of the electric motorcycle: a rotational speed sensor, a vehicle speed sensor, an accelerator displacement amount sensor, and a brake sensor, and
  a third start condition in which it is determined by the driving command sensor that the driver inputs a stop command condition to stop generation of torque in the electric motor.

6. The electric motorcycle according to claim 1,
wherein the processor inhibits shifting to the regenerative mode when the cornering sensor determines that the electric motorcycle is cornering.

7. The electric motorcycle according to claim 6,
wherein when the cornering sensor determines that the electric motorcycle is cornering while in the normal mode, the processor inhibits shifting to the regenerative mode and causes a notification device to notify the driver that shifting to the regenerative mode is inhibited.

8. The electric motorcycle according to claim 1,
wherein the processor shifts from the normal mode to the regenerative mode when the cornering sensor determines that a cornering of the electric motorcycle has finished while the predetermined shift condition is satisfied while in the normal mode.

9. The electric motorcycle according to claim 1,
wherein when the cornering sensor determines that the electric motorcycle is cornering while in the regenerative mode, the processor inhibits the electric motorcycle from shifting to the normal mode and causes a notification device to notify that shifting to the normal mode is inhibited.

10. An electric vehicle control method comprising the steps of:
  receiving a driving command input by a driver of the electric vehicle;
  receiving a state value different from the driving command input;
  controlling an output of an electric motor of the electric vehicle in response to the driving command input while the electric vehicle is operating in a normal mode;
  causing the electric motor to generate regenerative electric power by using the electric motor as a generator while the electric vehicle is operating in a regenerative mode;
  shifting the electric vehicle from one of the normal mode and the regenerative mode to the other of the normal mode and the regenerative mode when the state value satisfies a predetermined shift condition while the electric vehicle is in the one of the normal mode and the regenerative mode; and
  determining whether or not the electric vehicle is cornering;
  wherein in the step of shifting the electric vehicle from one of the normal mode and the regenerative mode to the other of the normal mode and the regenerative mode, a change in the output of the electric motor is caused to be less when it is determined that the electric vehicle is cornering while the predetermined shift condition is satisfied than when it is determined that the electric vehicle is not cornering while the predetermined shift condition is satisfied.

* * * * *